US010305235B2

(12) United States Patent
Spada (10) Patent No.: US 10,305,235 B2
(45) Date of Patent: May 28, 2019

(54) ELECTRICAL ENERGY DISTRIBUTION DEVICE CONNECTABLE TO ELECTRICAL COMPONENTS

(71) Applicant: Letroh, S.r.l., Rozzano (IT)

(72) Inventor: Marco Spada, Opera (IT)

(73) Assignee: Letroh, S.r.l., Rozzano (IT)

( * ) Notice: Subject to any disclaimer, the term of this patent is extended or adjusted under 35 U.S.C. 154(b) by 0 days.

(21) Appl. No.: 15/549,362

(22) PCT Filed: Feb. 5, 2016

(86) PCT No.: PCT/IB2016/050609
§ 371 (c)(1),
(2) Date: Aug. 7, 2017

(87) PCT Pub. No.: WO2016/125117
PCT Pub. Date: Aug. 11, 2016

(65) Prior Publication Data
US 2018/0034221 A1 Feb. 1, 2018

(30) Foreign Application Priority Data
Feb. 6, 2015 (IT) .............................. UD2015A0012

(51) Int. Cl.
| H02G 3/08 | (2006.01) |
| H01R 25/14 | (2006.01) |
| A47B 96/14 | (2006.01) |
| F21V 21/35 | (2006.01) |
| H02H 7/22 | (2006.01) |
| H02J 3/14 | (2006.01) |

(52) U.S. Cl.
CPC ........... *H01R 25/142* (2013.01); *A47B 96/14* (2013.01); *F21V 21/35* (2013.01); *H01R 25/14* (2013.01); *H01R 25/145* (2013.01); *H02G 3/081* (2013.01); *H02H 7/22* (2013.01); *A47B 2220/0077* (2013.01); *H02J 2003/143* (2013.01)

(58) Field of Classification Search
CPC ...................................................... H01R 25/14
See application file for complete search history.

(56) References Cited

U.S. PATENT DOCUMENTS

| 3,919,457 A * | 11/1975 | Steiner | ............... H01R 25/14 |
| | | | 174/491 |
| 3,993,385 A | 11/1976 | Seger | |
| 4,108,523 A | 8/1978 | Bolis | |
| 6,039,584 A * | 3/2000 | Ross | ............... H01R 25/14 |
| | | | 439/115 |
| 2003/0021111 A1* | 1/2003 | Miller | ............... H01R 25/14 |
| | | | 362/648 |

(Continued)

OTHER PUBLICATIONS

International Search Report and Written Opinion from corresponding International Application No. PCT/IB2016/050609 dated Apr. 28, 2016; (10 pp).

*Primary Examiner* — Tho D Ta
(74) *Attorney, Agent, or Firm* — Calderone Bullock LLC (57) ABSTRACT

An electric energy distribution device connectable to electrical components that comprises a containing body with an oblong development, provided with an internal compartment. The internal compartment extends for the entire length of the containing body and a plurality of electrical conductors are housed inside it.

12 Claims, 4 Drawing Sheets fig. 1

(56) References Cited

U.S. PATENT DOCUMENTS

| | | | |
|---|---|---|---|
| 2003/0021116 A1* | 1/2003 | Miller | F21S 8/00 |
| | | | 362/249.01 |
| 2006/0207778 A1 | 9/2006 | Walter | |
| 2007/0042625 A1* | 2/2007 | Otto | H01R 25/142 |
| | | | 439/212 |
| 2011/0261508 A1* | 10/2011 | Ross | H01R 25/14 |
| | | | 361/624 |
| 2013/0107501 A1 | 5/2013 | Ewald et al. | |

\* cited by examiner

ELECTRICAL ENERGY DISTRIBUTION DEVICE CONNECTABLE TO ELECTRICAL COMPONENTS

BACKGROUND OF THE INVENTION

Field of the Invention

The present invention concerns an electric energy distribution device connectable to electrical components to allow to install the latter in different spaces and to serve a differentiated plurality of electrical and/or electronic devices of different type and function, hereafter indicated with the generic term of electrical components.

Merely by way of example, examples of electrical components or user devices in which the present invention can be used are lighting devices, electric connection sockets, electronic devices, data transmission cables, electric power cables or a possible combination thereof.

The present invention can be applied, though not exclusively, in the industrial field, in commercial buildings such as shops, or in domestic buildings such as houses.

Description of Related Art

Electric energy distribution devices are known, to distribute electric energy to lighting devices which are usually installed suspended in rooms or buildings, and configured both to bring electric energy and also to support one or more lighting devices.

Known electric energy distribution devices, also known as electrified tracks, generally consist of a containing body or section bar, with an oblong development, defining an internal compartment that extends for the whole of its length and in which a plurality of electrical conductors are housed.

In particular, tracks are known to define a single electric power circuit, which are also known in jargon as single-phase tracks, or to define three electric power circuits, also called three-phase tracks.

Single-phase tracks are provided with two electrical conductors, usually a neutral conductor and a phase conductor, to which one or more lighting devices are selectively connected, possibly by specific connectors or plugs.

Three-phase tracks are normally provided with four electrical conductors including one neutral conductor and three phase conductors, which are connected to the lighting devices and each of them to the neutral conductor to define three electric power circuits that are separate and can possibly be powered independently and selectively. Each circuit may possibly correspond to a 230 V electric line of 16 A.

The electrified tracks, whether single-phase or three-phase, can also be provided with another conductor to earth the power circuit.

Typically, the containing bodies have a more or less square section and the electrical conductors are usually installed on at least two opposite walls of the containing body. Connection to the conductors is obtained by connection devices that can be attached to the containing body and provided with contact elements that during use contact each one of the conductors. However, because of its geometric configuration, this solution cannot be used directly for the simple production of an electric circuit and/or to transfer the electric energy from one power point to the user device, and its use is reserved solely to the lighting field.

Therefore, the bulk of current single-phase and three-phase tracks limits their application in rooms and in particular conditions of use, as such tracks are almost always attached to the ceiling, for example suspended, unlike a wall attachment, which is only done rarely.

Furthermore, some electrified tracks can also be equipped with indirect lighting, to be combined with direct light which is usually delivered by the lighting devices installed on the electrified track.

Containing bodies are also known with the function of electric cable ducts, with a tubular cross section and rectangular in shape.

Electric cable ducts are usually installed on walls of buildings, and the electric wires needed to make the electric power circuits required by the design are made to pass inside them.

Electric cable ducts allow the wires to pass, for example to carry electric power toward one or more electrical components, such as electric sockets, lighting devices, connections to electronic devices and/or telecommunication devices.

However, this solution requires to make suitable shunts from the electric cable ducts, for example to install electric connection sockets or for electric power supply, to lighting devices.

Furthermore, if it is necessary to move a user device, the substantive installation configuration of electric cable ducts has to be modified, and also the shunts connected to them.

Documents US 2006/0207778 A1 and US 2013/107501 A1 describe known systems for the single-phase distribution of electric energy which are rather bulky and unsuitable for making efficient and compact three-phase devices.

Document U.S. Pat. No. 4,108,523 A describes a cable duct to distribute electric energy that needs screws or other connection means to be able to connect the various connection and use devices.

Furthermore, these documents have bulk and characteristics such that they do not allow installation in any space or on any wall in a stable, safe and effective way, and also able to confer a satisfactory esthetic appearance.

BRIEF SUMMARY OF THE INVENTION

One purpose of the present invention is to obtain an electric energy distribution device, in particular a three-phase electric energy distribution device, connectable to electrical components, which is extremely versatile and can be adopted for a plurality of applications.

Another purpose of the present invention is to obtain an electric energy distribution device connectable to electrical components that is extremely simple and economical.

Another purpose of the present invention is to simplify the operations to install the electric energy distribution device and also to connect the electrical components to it.

Another purpose of the present invention is to obtain an electric energy distribution device that respects the safety regulations.

Another purpose of the present invention is to perform, with a single component, both the function of an electrified track to power a vast range of light sources, and also the function of an electric or electrified cable duct to take power to electric sockets, or data or telephone sockets, etc.

Another purpose is to obtain a device as above that has limited thickness, compared with the common elements for powering light points, with the possibility of installing them in the most varied locations, hence on any wall of any space, and supplying a great ornamental value, in addition to the functional value.

Another purpose of the present invention is to obtain an apparatus to distribute and use electric energy in which an electric energy distribution device, such as an electric cable duct, a track or suchlike, can be associated with a connection device able to guarantee electric connections and mechanical seal without the aid of external connection means or elements, such as screws or other.

The Applicant has devised, tested and embodied the present invention to overcome the shortcomings of the state of the art and to obtain these and other purposes and advantages.

The present invention is set forth and characterized in the independent claims, while the dependent claims describe other characteristics of the invention or variants to the main inventive idea.

In accordance with the above purposes, an electric energy distribution device connectable to electrical components, according to the invention, comprises a containing body with an oblong development, provided with an internal compartment that extends for the entire length of the containing body and in which a plurality of electrical conductors are housed.

According to one aspect of the present invention, the containing body is provided with at least two long walls and at least one short wall that connects the long walls with each other to define a substantially flattened rectangular shape of the cross section.

This geometric configuration of the cross section makes the containing body particularly suitable for installation in proximity to walls or surfaces, containing the overall protruding bulk of the containing body itself once installed.

According to another aspect of the present invention, the containing body is provided with a longitudinal aperture made in a position opposite the short wall in order to allow access to the electrical conductors, by means of a connection device. The presence of a longitudinal aperture allows to connect to the electrical conductors at any point whatsoever along the length of the containing body, making the electric energy distribution device particularly versatile for the different installations required and/or for possible modifications to the positioning/connection of the individual electrical components. In this case, it is no longer required to modify the configuration of the containing body, as happened in the state of the art, it is enough to modify the positioning of the connection device to which the electrical component or components are connected.

According to another aspect of the present invention, the electrical conductors are installed in a fixed position on only one of the long walls defining the containing body.

Positioning the electrical conductors on a single long wall allows to greatly contain the bulk in thickness of the containing body and therefore allows to obtain a flattened rectangular shape of the cross section, and also facilitates the operations to install the containing body, for example on a wall.

According to a possible variant of the present invention, in the internal compartment four electrical conductors can be installed in a fixed position, defining a three-phase track of the type identified above. This configuration allows on the one hand, in the case of single-phase power, to define three electric power circuits substantially independent of each other and selectively connectable to the electric power source, or, in the case of three-phase power, to associate the three phases to three of the electrical conductors and to associate the neutral to the other conductor.

It is not excluded that in possible variants, there may be more than four electrical conductors present in the containing body, for example five, six or more.

According to another variant of the present invention, one of the long walls is provided, on its surface that is external during use, with connection means configured to allow the direct or indirect attachment of the containing body to a wall.

According to another variant, the containing body can also be configured to house, in the internal compartment, conductor cables for the transmission of electric power, data or communication. This greatly extends the field of application of the present invention to different sectors.

The present invention also concerns a connection device for the connection of electrical components comprising a connection body provided with at least two contact elements both provided on a same face of the connection body configured to be inserted through the longitudinal aperture of a containing body of an electric energy distribution device as described above, and to position the contact elements of the connection device each in contact with one of the electrical conductors of the containing body.

The present invention also concerns an apparatus to distribute and use electric energy comprising an electric energy distribution device connectable to electrical components and a connection device as described above.

BRIEF DESCRIPTION OF THE SEVERAL VIEWS OF THE DRAWINGS

These and other characteristics of the present invention will become apparent from the following description of some embodiments, given as a non-restrictive example with reference to the attached drawings wherein.

DETAILED DESCRIPTION OF THE INVENTION

To facilitate comprehension, the same reference numbers have been used, where possible, to identify identical common elements in the drawings. It is understood that elements and characteristics of one embodiment can conveniently be incorporated into other embodiments without further clarifications.

We shall now refer in detail to the various embodiments of the present invention, of which one or more examples are shown in the attached drawing. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Figures 1, 2:
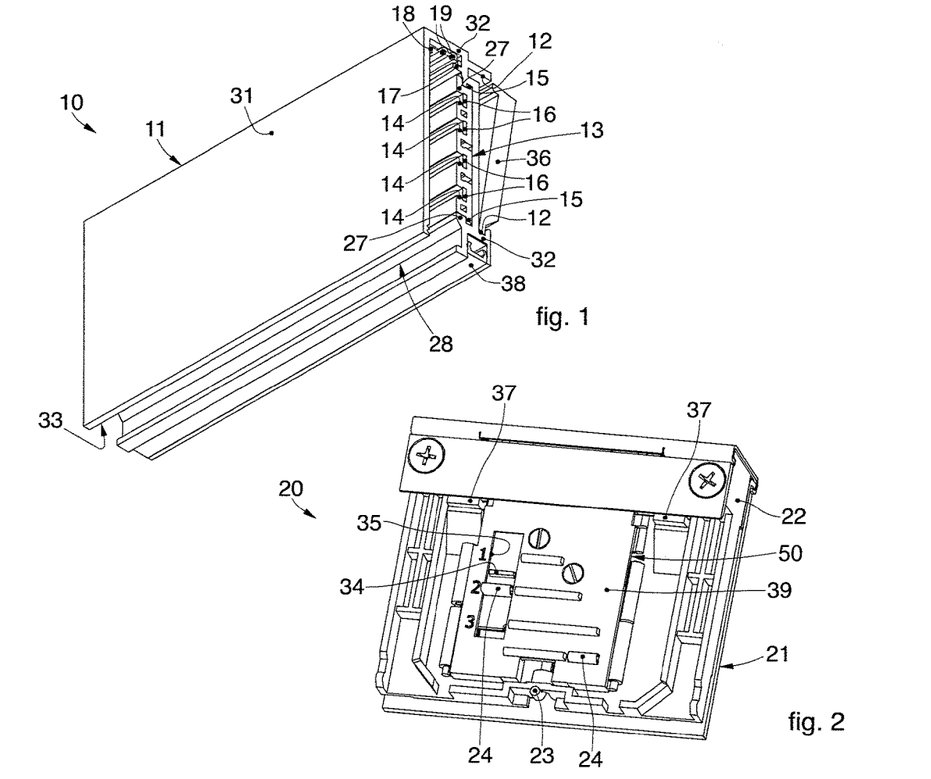
FIG. 1 is a perspective view of an electric energy distribution device connectable to electrical components according to the present description.
FIG. 2 is a perspective view of a connection device according to the present invention, connectable to the electric energy distribution device in FIG. 1.

According to the embodiment in FIG. 1, the invention concerns an electric energy distribution device 10 connectable to electrical component that comprises a containing body 11 with an oblong development and provided with an internal compartment 28 that extends for the entire length of the containing body 11.

Merely by way of example, the containing body 11 can be defined by a section bar made of metal material, for example aluminum, or polymer material such as polyvinylchloride.

The containing body 11 has a substantially flattened rectangular shape of the cross section and defined by two long walls 31 and at least one short wall 32 that connects the long walls 31 with each other.

In the embodiment in FIG. 1, the containing body 11 is provided with two short walls 32, each of which is connected to the long walls 31 near the respective ends.

According to a variant, the long walls 31 have a height comprised between 3 and 5 times the height of the short walls 32.

The containing body 11 is also provided with a longitudinal aperture 33 made on one of the short walls 32.

The longitudinal aperture 33 extends for the entire length of the short wall 32, so as to allow access to the internal compartment 28 (shown in FIG. 1) at any point whatsoever along the longitudinal extension of the containing body 11.

According to a variant, both the long walls 31 and the short wall 32 in which the longitudinal aperture 33 is made are substantially solid, i.e. they have no access apertures. This allows to respect safety regulations for the electric energy distribution device 10, preventing access for example to the internal compartment except through the longitudinal aperture 33.

The longitudinal aperture 33 can also have sizes suitable to prevent direct access by the user, for example with the fingers. Merely by way of example, the longitudinal aperture 33 has a width comprised between about 5 mm and about 10 mm.

According to a variant, one of the long walls is provided, on its surface that is external during use, with connection means 12 configured to allow the direct or indirect attachment of the containing body 11 to a wall.

According to the variant shown in FIG. 1, the attachment means 12 can be attached to an anchoring bracket 36, installed for example on a bearing element such as the wall 30 of a room, a ceiling, a piece of furniture or a shelf.

The connection means 12 can be chosen from a group comprising through holes, attachment teeth, shaped seatings, snap-in connection elements, adhesive strips.

In the internal compartment 28 of the containing body 11, a plurality of electrical conductors 16 are installed, in a fixed position, on only one of the long walls 31.

Merely by way of example, the electrical conductors 16 can be installed directly in longitudinal grooves provided or made directly in the containing body 11, for example if the containing body is made of electrically non-conductive material.

According to the variant shown in FIG. 1, the containing body 11 is provided with a first support and positioning element 13 with an oblong development, attached to one of the long walls 31, made of an electrically insulating material and provided with a plurality of grooves 14 in each of which one of the electrical conductors 16 is installed.

The presence of a first support and positioning element 13 allows to make the containing body 11 separately, adapting it for example to the specific design specifications, and to subsequently house inside it the first support and positioning element 13, also chosen in relation to the number of electrical conductors to be installed.

The first support and positioning element 13 also has the function of insulating the electrical conductors 16 electrically, at least with respect to the containing body 11, which can therefore be made of any material whatsoever, even electrically conductive material.

The function of the grooves 14 is to at least partly contain inside them the electrical conductors 16, and to generate a protection against possible involuntary contacts by a user, both for example with the fingers and also, possibly, with work tools such as screwdrivers.

To this purpose, the design of the shape of the grooves 14 and their depth is particularly important.

The first support and positioning element 13 comprises a plurality of grooves 14 with a development in length advantageously about equal to the length of the first support and positioning element 13 and with a depth and width depending on the width of the containing body 11.

The first support and positioning element 13 can be configured to have, at its ends, protuberances 15 that can cooperate with mating attachment portions 27 provided on the inside of one of the long walls 31 of the containing body 11. The cooperation between protuberances 15 and attachment portions 27 allows to insert, by sliding, the first support and positioning element 13 inside the containing body 11 and to position it correctly in a position adjacent to the internal surface of one of the long walls 31 of the containing body 11.

Figure 4:
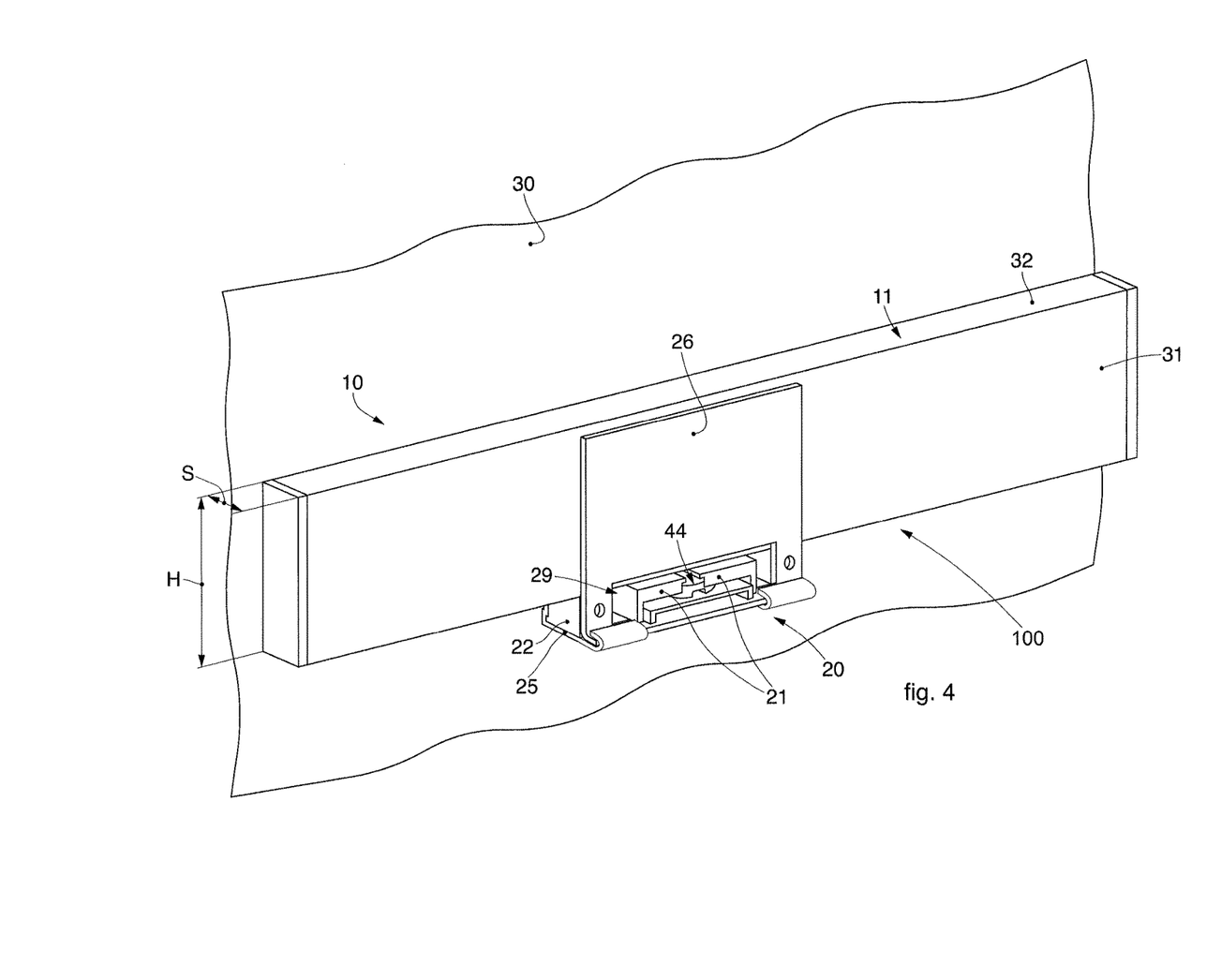
FIG. 4 is a perspective view of FIG. 3.

In this embodiment, the first support and positioning element 13 is located in correspondence with only one internal wall of the containing body 11, to reduce to a minimum the thickness S of the containing body 11 with respect to its height H (FIG. 4).

By way of example, the short wall 32 that defines the thickness S of the containing body 11 can measure between about 16 mm and 21 mm, while the long wall 31, which defines the height H of the containing body 11, can measure between about 50 mm and 65 mm.

In this way, the thickness of the internal compartment 28 of the containing body 11 is advantageously reduced and it is possible not only to guarantee extreme safety, but also to guarantee an advantageously flattened form of the electric energy distribution device 10.

Access to the internal compartment 28 through the longitudinal aperture 33, observing its installation on the wall 30, is therefore advantageously reduced and hence extremely safe.

The reduced thickness of the internal compartment 28 also contributes to an effective positioning of the connection device 20, without using screws or other external connection means.

Inside each of the grooves 14 an electrical conductor 16 can be housed, made of copper or any other electrically conductive material.

In the embodiment shown, the first support and positioning element 13 comprises four grooves 14 for corresponding four electrical conductors 16, where three conductors 16 power the three phases and one conductor 16 is a neutral conductor.

In another variant, the containing body 11 can comprise a second support and positioning element 18, configured to support one or more conductor wires 19 for data transmission, or telephone, or low-voltage electric power.

In the variant shown, the second support and positioning element 18 is installed in a fixed position on the short wall 32 not affected by the longitudinal aperture 33.

In this way, the installation and positioning inside the containing body 11 of both the electrical conductors 16 and the conductor wires 19 for data transmission or telephone is greatly facilitated, ordered and convenient, also leaving the internal compartment 28 free for the insertion of a connection device 20 as described hereafter.

Figure 3:
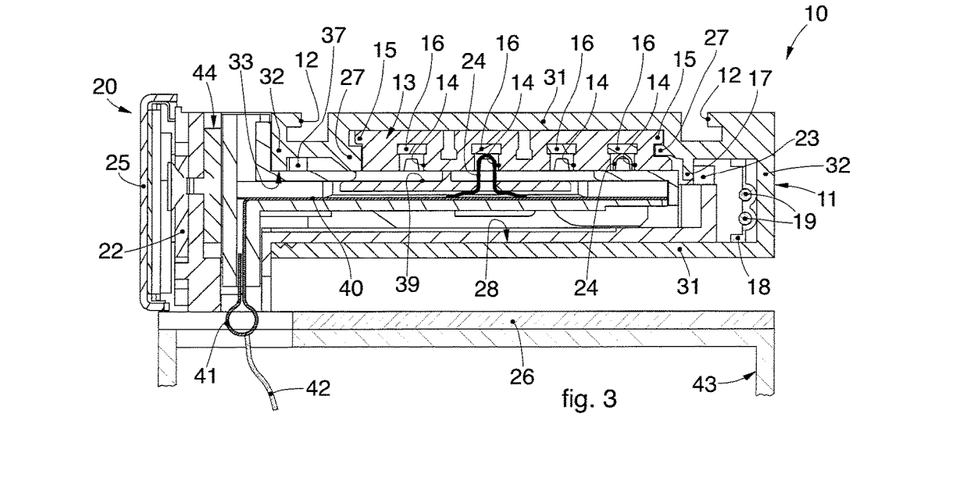
FIG. 3 is a cross section of a connection device inserted in an electric energy distribution device according to the present invention.

In the embodiment shown in FIGS. 2, 3 and 4, the connection device 20 allows to connect the electrical conductor 16 to one or more electric user devices of various types, such as lighting devices, electric sockets, electronic devices or other.

The connection device 20 comprises a connection body 21 provided with at least two contact elements 24 both provided on a same face 39 of the connection body 21.

The connection body 21 is configured to be inserted through the longitudinal aperture 33 of the containing body 11, in order to position the contact elements 24 each in contact with one of the electrical conductors 16.

In particular, the contact elements 24 are positioned in the connection body 21 in a position coordinated with the position of the electrical conductors 16 provided in the containing body 11.

A positioning element 34 is associated or integrated with at least one of the contact elements 24, and is configured to allow the selective positioning of the contact element 24 on the face 39 of the connection body 21.

In fact, the positioning element 34 allows to position the contact element 24 in a position suitable to contact one of the electric phase conductors 16 present in the containing body 11.

The other contact element 24 can be maintained always in a fixed position, for example, to contact the neutral electrical conductor 16 which is present in the containing body 11.

In this way, a single connection device 20 can be adopted for the connection to any one whatsoever of the phases present in the containing body 11, simply by modifying the position of the contact element 24.

According to the variant in FIG. 2, the mobile contact element 24 is made to translate in a seating 35 made on the face 39 of the connection body 21 and which contacts an electrically conductive element 40 to supply electric energy.

Each of the contact elements 24 can be connected in turn to connection terminals 41 in which cables 42 can be connected to connect to one or more electrical components 43, such as an electric socket or a lighting device.

According to a possible variant, the contact elements 24 can be associated with activation/deactivation members 44, configured to take the contact elements 24 into at least a first operating position retracted inside the connection body 21, and a second operating position protruding from the face 39 of the connection body 21, to allow contact with the electrical conductors 16.

The connection device 20 is also provided with a head 22, located during use protruding with respect to the connection body 21, and on which the user can act to allow the insertion of the connection body 21 into the internal compartment 28.

The head 22 can be provided with a cover 25, installed sliding on the head 22 and connected to the activation/deactivation members 44. In this way, the sliding of the cover 25 can determine the selective activation/deactivation of the activation/deactivation members 44 as defined above.

According to a possible variant, the connection device 20 is provided with coupling members 23, selectively able to be activated to define a solid coupling of the connection device 20 with the containing body 11, preventing the connection device 20 from becoming accidentally detached from the containing body 11 once installed.

The coupling members 23 can comprise, for example, a lever, a snap-in coupling element or other similar or comparable elements.

According to a variant, the coupling members 23 can be selectively activated/deactivated by the activation/deactivation members 44.

The containing body 11 can be provided, in its internal compartment 28, with a retaining element 17, in this case an abutment tooth, cooperating with the coupling members 23 to define the solid coupling.

According to a possible variant, it is possible to provide that the coupling members 23 are connected to the cover 25 and that a sliding of the latter with respect to the head 22 determines the selective activation of the coupling members 23.

According to a possible variant, not shown in the drawings, the electric energy distribution device 10 can also be equipped with an electrical conductor for connection to earth. According to this variant, the connection device 20 can also be provided with one or more contact elements 37 provided to contact the electrical conductors for connection to earth.

According to a possible variant, the contact elements 37 can be selectively activated to move into contact with the electrical conductors for connection to earth, for example due to the action of the activation/deactivation members 44 cited above, or other activation/deactivation members. Furthermore, if the containing body 11 is made of an electrically conductive material, it can be selectively connected to earth and the contact elements 37 present in the connection device 20 define the connection of the electrical component 43 with the earth.

The connection device 20 can be provided with a support element 26, such as a plate or a bracket, configured to support one or more electrical components 43.

According to another variant, not shown in the drawings, the connection device 20 can be provided with auxiliary contact elements to contact one or more of the conductor wires 19 present inside the internal compartment 28 and to determine the connection with an electrical component.

In another embodiment, on at least one short wall 32, electronic devices, for example strips of LEDs 38, or any other type, can be housed along the whole profile, or on part of its length.

The connection device 20 (see FIGS. 5a and 6a) is associated with the sliding cover or slider 25 which substantially commands the electric and mechanical connection of the connection device 20 to the electric energy distribution device 10, through the activation/deactivation members 44.

Figure 6A:
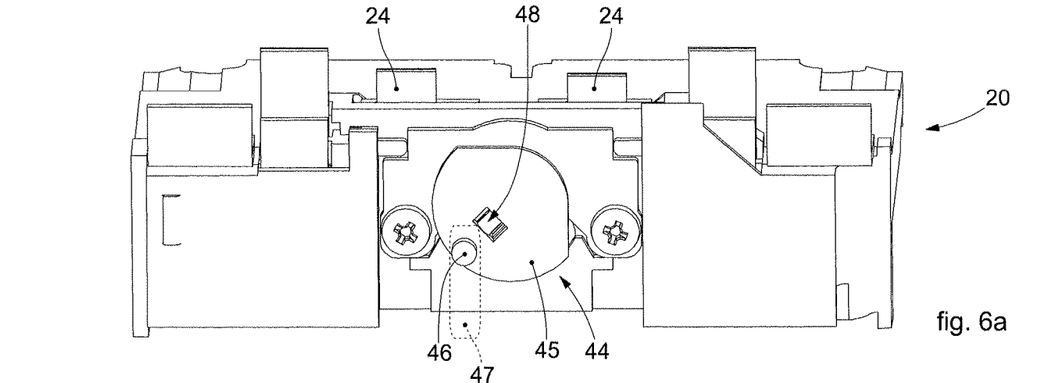
FIG. 6a is a second perspective view, from the opposite side with respect to FIG. 5a, of the connection device before insertion into the electric energy distribution device.

FIG. 6a is a view of the connection device 20 from the side of the sliding cover 25, with the latter removed so as to show the activation/deactivation members 44.

The activation/deactivation members 44 comprise a crank 45 provided with a pin 46, or crank button, which engages in a slot 47 made in the sliding cover 25.

The crank 45 is integral with a suitably shaped lever 48 which passes through the connection device 20.

The lever 48 comprises the crank 45 at one end and, at the other, the coupling members 23, represented in this case substantially by a pin that will engage with the retaining element 17 of the electric energy distribution device 10 (see also FIG. 3).

The lever 48 comprises a segment 49 that is suitably offset with respect to its axis of rotation R.

The connection device 20 comprises a slider 50 that can be translated upward or downward with respect to the connection device 20.

The contact elements 24 and the positioning element 34 are housed on the slider 50, to select the phase chosen from between the at least three phases of the electric energy distribution device 10. The positioning element 34 is visible in FIG. 2.

One of the contact elements 24 is then translated by the positioning element 34 so as to choose one of the three phases on the slider 50, and therefore which position the contact element 24 will assume on the slider 50 to be connected with one of the electrical conductors 16.

Figure 5A:
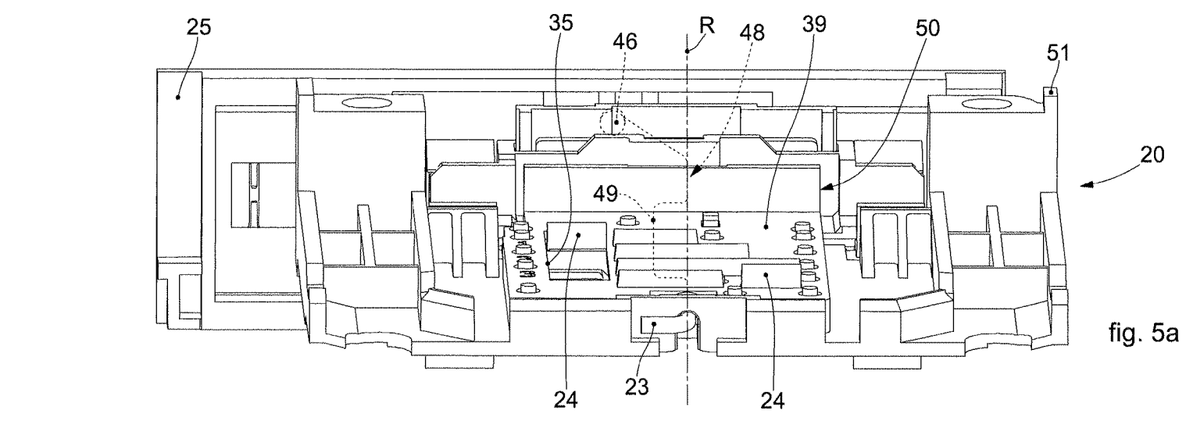
FIG. 5a is a first perspective view of the connection device before insertion into the electric energy distribution device.

The sliding cover 25 at this moment is in the retracted position and the slider 50 is lowered (see FIGS. 5a and 6a).

When the phase has been chosen, the connection device 20 is inserted into the internal compartment 28 of the electric energy distribution device 10 through the longitudinal aperture 33 and in any desired position along the internal compartment 28.

Figure 5B:
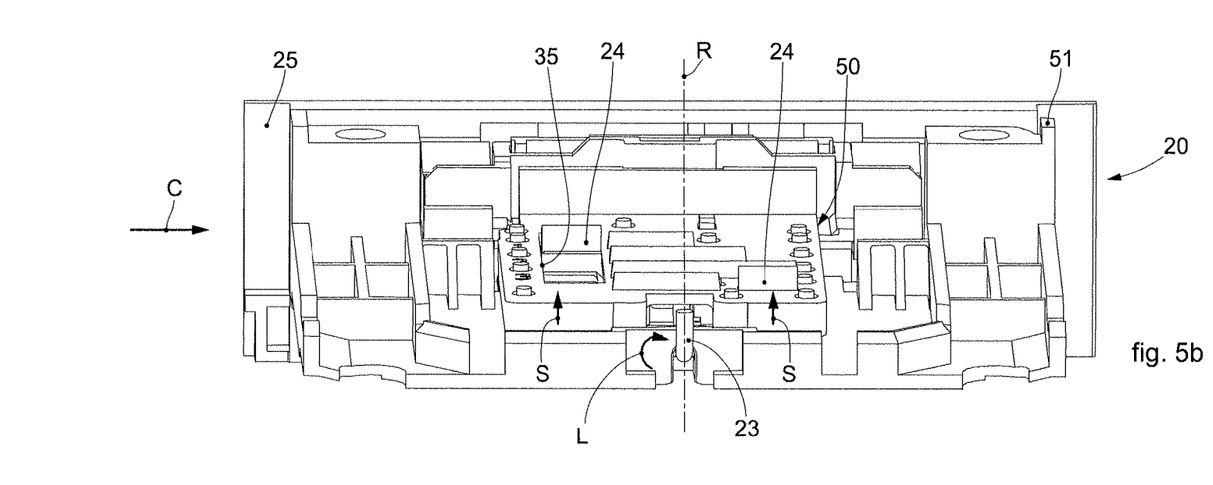
FIG. 5b is a first perspective view of the connection device after insertion into the electric energy distribution device, hence with electric and mechanical connections already complete.

At this point, to put the chosen contact element 24 into physical contact with the corresponding electrical conductor 16, and at the same time to guarantee a mechanical seal with the connection device 20, the sliding cover 25 is translated in the direction of arrow C in FIG. 5b, until it abuts on an end-of-travel element 51 of the connection device 20.

Figure 6B:
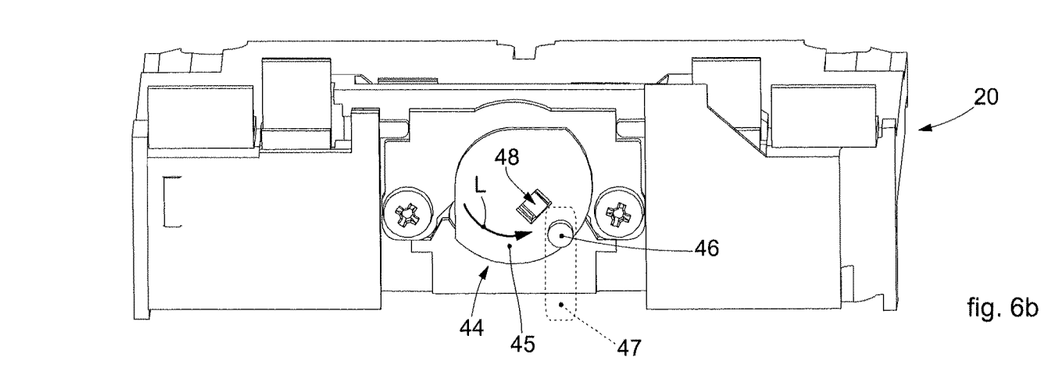
FIG. 6b is a second perspective view, from the opposite side with respect to FIG. 5b, of the connection device after insertion into the electric energy distribution device.

The slot 47 of the sliding cover 25, as it translates, determines a rotation of the crank 45, thanks to the pin 46 engaged in the slot 47 (see FIG. 6b). The crank 45 makes the lever 48 rotate around the axis of rotation R. The segment 49 of the lever 48, being offset with respect to the axis of rotation R, following said rotation is lifted and causes the lifting of the slider 50 (see arrows S).

The segment 49 therefore represents a cam in contact with the slider 50 and by means of which it is possible, following the rotation of the lever 48, to translate the slider 50 in one direction or the other.

Lifting the slider 50 determines the correct and effective electric contact of the connection device 20 with the electric energy distribution device 10.

The mechanical seal and hence the stability of the positioning of the connection device 20 in the electric energy distribution device 10 is guaranteed by the coupling members 23, in this case a pin solid with the lever 48. The pin, rotating in direction L, preferably simultaneously with the lifting of the slider 50, moves to a position such as to engage with the retaining element 17 of the electric energy distribution device 10.

By inserting the connection device 20 inside the electric energy distribution device 10, an apparatus 100 is therefore obtained for distributing and using electric energy that can be used in any space and on any wall or ceiling, safely, efficiently and with considerable advantages also from the esthetic point of view.

It is clear that modifications and/or additions of parts may be made to the electric energy distribution device connectable to electrical components as described heretofore, without departing from the field and scope of the present invention.

It is also clear that, although the present invention has been described with reference to some specific examples, a person of skill in the art shall certainly be able to achieve many other equivalent forms of electric energy distribution device connectable to electrical components, having the characteristics as set forth in the claims and hence all coming within the field of protection defined thereby.

I claim:

1. An apparatus comprising
an electric energy distribution device connectable to electrical components, the device comprising a containing body with an oblong development, provided with an internal compartment that extends for the entire length of the containing body, wherein within said internal compartment at least four electrical conductors are housed, defining a three-phase system, wherein the containing body is provided with two long walls and at least one short wall that connects the long walls with each other to define a substantially flattened rectangular shape of the cross section, wherein the containing body is provided with a longitudinal aperture made in a position opposite said at least one short wall in order to allow access to said electrical conductors, by means of a connection device, and wherein said electrical conductors are installed in a fixed position on only one of the long walls, leaving the other long wall of said containing body free; and
a connection device for the connection of electrical components comprising a connection body provided with at least two contact elements both provided on a same face of said connection body and suitable to be inserted through the longitudinal aperture of the electric energy distribution device in order to position said contact elements each in contact with one of said electrical conductors, said connection device further comprising activation/deactivation members and a sliding cover associated with said activation/deactivation members and a slider to house the contact elements associated with said activation/deactivation members, said slider being translatable in order to activate/deactivate said contact elements due to the driving of said activation/deactivation members.

2. The apparatus as in claim 1, wherein said long walls have a height comprised between 3 and 5 times the height of said at least one short wall.

3. The apparatus as in claim 1, wherein one of said long walls is provided, on its surface that is external during use, with connection means configured to allow the direct or indirect attachment of said containing body to a wall.

4. The apparatus as in claim 1, wherein conductor wires are installed in said internal compartment.

5. The apparatus as in claim 1, wherein the connection device further comprises a positioning element that is associated with at least one of said contact elements and is configured to translate the contact element to a suitable position to select one of said electrical conductors to be contacted in the internal compartment.

6. The apparatus as in claim 1, wherein the longitudinal aperture is sized to prevent direct access by a user's fingers.

7. The apparatus as in claim 1, wherein the longitudinal aperture has a width between about 5 mm and about 10 mm.

8. The apparatus as in claim 1, wherein the device further comprises a first support and positioning element with an oblong development, attached to one of said long walls made of an electrically insulating material and provided with a plurality of grooves in each of which one of said electrical conductors is installed.

9. The apparatus as in claim 8, wherein one of said long walls is provided with attachment portions configured to attach said first support and positioning element to said long wall.

10. The apparatus as in claim 1, further comprising coupling members with the electric energy distribution device selectively able to be activated/deactivated by said activation/deactivation members.

11. The apparatus as in claim 10, wherein said coupling members are selectively activated/deactivated by the activation/deactivation members together with the activation/deactivation translation of said slider.

12. An apparatus comprising
an electric energy distribution device connectable to electrical components, the electric energy distribution device comprising a containing body with an oblong development, provided with an internal compartment that extends for the entire length of the containing body, wherein within said internal compartment at least four electrical conductors are housed, defining a three-phase system, wherein the containing body is provided with two long walls and at least one short wall that connects the long walls with each other to define a substantially flattened rectangular shape of the cross section, wherein the containing body is provided with a longitudinal aperture made in a position opposite said at least one short wall in order to allow access to said electrical conductors, by means of a connection device, and wherein said electrical conductors are installed in a fixed position on only one of the long walls, leaving the other long wall of said containing body free; and
a connection device for the connection of electrical components comprising a connection body provided with at least two contact elements both provided on a same face of said connection body and suitable to be inserted through the longitudinal aperture of the electric energy distribution device in order to position said contact elements each in contact with one of said electrical conductors, said connection device further comprising activation/deactivation members and a sliding cover associated with said activation/deactivation members and further comprising coupling members with the electric energy distribution device selectively able to be activated/deactivated by said activation/deactivation members.

* * * * *